(12) United States Patent
Baudasse

(10) Patent No.: US 9,212,692 B2
(45) Date of Patent: Dec. 15, 2015

(54) COMPACT FLEXIBLE CARDAN JOINT AND SPACECRAFT COMPRISING SUCH A JOINT

(75) Inventor: Yannick Baudasse, Grasse (FR)

(73) Assignee: Thales (FR)

( * ) Notice: Subject to any disclaimer, the term of this patent is extended or adjusted under 35 U.S.C. 154(b) by 287 days.

(21) Appl. No.: 13/880,937

(22) PCT Filed: Oct. 12, 2011

(86) PCT No.: PCT/EP2011/067836
§ 371 (c)(1),
(2), (4) Date: May 25, 2013

(87) PCT Pub. No.: WO2012/052337
PCT Pub. Date: Apr. 26, 2012

(65) Prior Publication Data
US 2014/0147193 A1    May 29, 2014

(30) Foreign Application Priority Data

Oct. 22, 2010 (FR) .................................... 1004156

(51) Int. Cl.
| | |
|---|---|
| F16C 11/12 | (2006.01) |
| B64G 1/66 | (2006.01) |
| F16C 11/06 | (2006.01) |
| F16M 11/12 | (2006.01) |
| H01Q 1/12 | (2006.01) |
| H01Q 1/28 | (2006.01) |

(52) U.S. Cl.
CPC . *F16C 11/12* (2013.01); *B64G 1/66* (2013.01); *F16C 11/06* (2013.01); *F16M 11/123* (2013.01); *H01Q 1/125* (2013.01); *H01Q 1/288* (2013.01); *F16C 2326/47* (2013.01); *Y10T 403/32041* (2015.01); *Y10T 403/32262* (2015.01); *Y10T 403/45* (2015.01)

(58) Field of Classification Search
CPC ........... B64G 1/66; F16C 11/04; F16C 11/12; F16C 2326/47; F16M 11/06; F16M 11/12; F16M 11/123; F16M 11/18; H01Q 1/125; H01Q 1/288
USPC .................... 403/52, 53, 57, 81, 84, 119, 220
See application file for complete search history.

(56) References Cited

U.S. PATENT DOCUMENTS

| | | | | |
|---|---|---|---|---|
| 19,150 | A | * | 1/1858 | Monson ...................... 285/127.2 |
| 2,950,079 | A | | 8/1960 | Horsfall, Jr. |
| 4,878,393 | A | * | 11/1989 | Duta et al. ................. 74/490.06 |
| 4,932,806 | A | * | 6/1990 | Eklund et al. ................... 403/57 |
| 7,140,969 | B2 | * | 11/2006 | Prucher ......................... 464/134 |
| 2007/0241244 | A1 | | 10/2007 | Tavassoli Hozouri |
| 2008/0272728 | A1 | * | 11/2008 | Gao .......................... 318/568.11 |

FOREIGN PATENT DOCUMENTS

EP        0449001 A1    10/1991

* cited by examiner

*Primary Examiner* — Josh Skroupa
(74) *Attorney, Agent, or Firm* — Baker & Hostetler LLP

(57) ABSTRACT

A flexible cardan joint comprises a hollow central longitudinal axis, two hollow pivots mounted orthogonally relative to one another and capable of pivoting respectively about a rotation axis, three axes being mutually orthogonal and intersecting at a point of rotation situated at the center of the cardan joint. Each pivot comprises an annular outer frame extending along a plane containing the central longitudinal axis Z and orthogonal to the rotation axis, a hollow inner ring coaxial to the outer frame and a plurality of sets of flexible blades linked to the outer frame and to the inner ring, and the two pivots are linked together by rigid link parts.

8 Claims, 11 Drawing Sheets

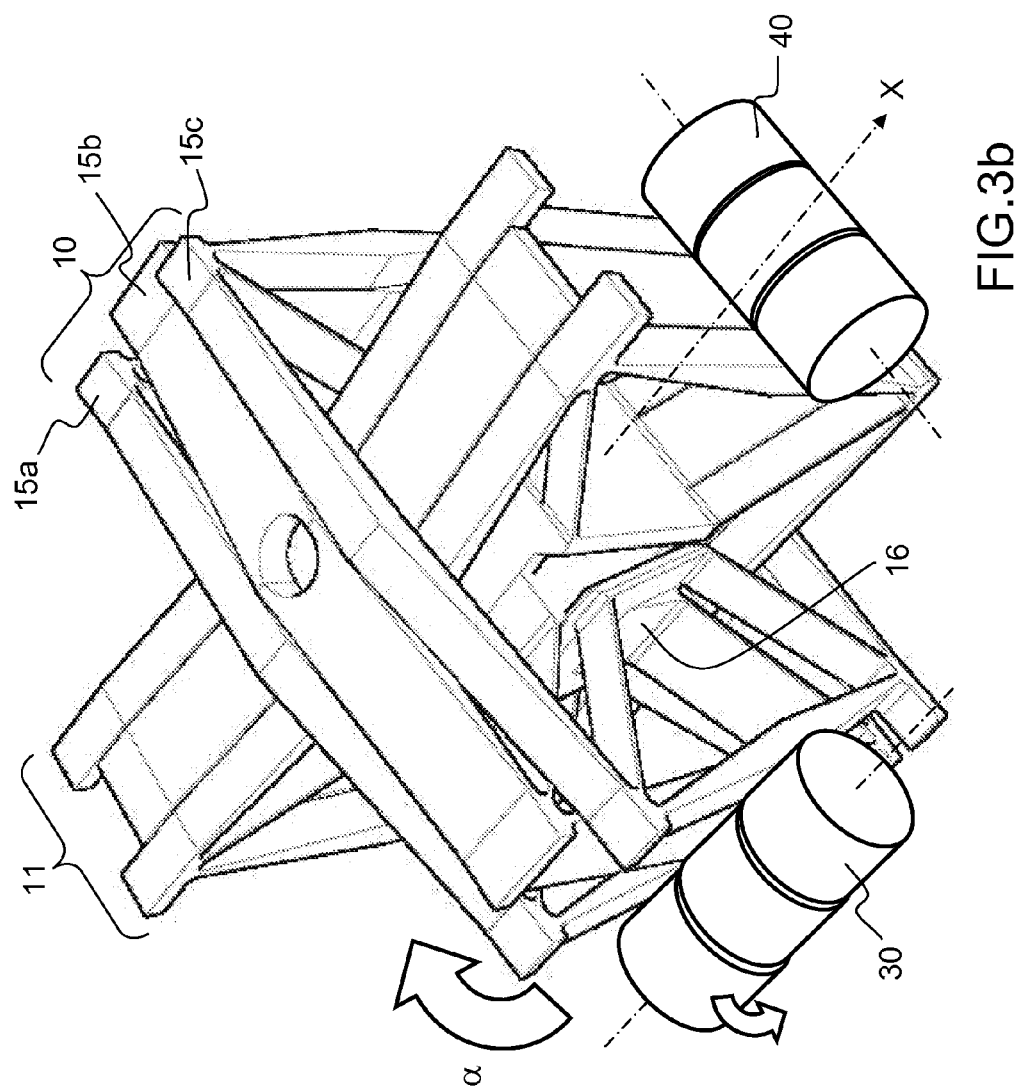

COMPACT FLEXIBLE CARDAN JOINT AND SPACECRAFT COMPRISING SUCH A JOINT

CROSS-REFERENCE TO RELATED APPLICATIONS

This application is a National Stage of International patent application PCT/EP2011/067836, filed on Oct. 12, 2011, which claims priority to foreign French patent application No. FR 1004156, filed on Oct. 22, 2010, the disclosures of which are incorporated by reference in their entirety.

FIELD OF THE INVENTION

The present invention relates to a compact flexible cardan joint capable of guiding an equipment item in rotation about two orthogonal axes and a spacecraft comprising such a cardan joint. It applies notably to the field of spacecraft such as satellites for finely guiding in rotation at least one element or one equipment item of the spacecraft to orient it in a predetermined pointing direction.

BACKGROUND

In space applications, it is necessary to be able to orient certain elements, such as, for example, an antenna, a mast or an equipment item, of a satellite or of a spacecraft, in a predetermined direction in order, for example, to point them toward an external target such as a planet, a receiver, or a transmitter, to retain a pointing to a point on the surface of the Earth or even to scan a particular area on the surface of the Earth or of any celestial body. These positionings have to be frequently corrected, notably during target tracking phases, to compensate for inevitable drifts in maintaining this direction and these multiple corrections mean that a significant number of micro-rotation cycles have to be performed for these space appendages and for their guiding devices.

Given the irreversible nature of the act of placing a satellite in orbit, it is necessary to plane, when designing the spacecraft, a lifespan, measured as a number of cycles (one cycle corresponding to one rotational oscillation), that is very great for these guiding devices, so as to guarantee their capacity to withstand the very many stresses to which they are subject. For example, the desired lifespan may be greater than 300 000 cycles for tracking mechanisms. Other demands for the guiding devices are a strong mechanical performance capability notably with respect to the external forces and the bending moments exerted on the guided shaft, a high transversal rigidity, high precision guidance without play, a significant rotation amplitude for flexible elements, typically of the order of 5 to 10°, in both positive and negative directions, and a low and constant resisting torque.

The known guiding mechanisms are mounted on rolling bearing or other bearing types and require lubricants to ensure correct operation. These guiding mechanisms are not flexible and comprise a large number of parts which results in a reduced reliability compared to a flexible cardan joint. Furthermore, these non-flexible guiding elements are sensitive to the external loads and impacts during the launching of the spacecraft. Furthermore, they require a specific lubrication that is sensitive to the micro-displacements and to the extreme temperatures.

It is known practice to produce a flexible cardan joint consisting of four simple flexible pivots mounted in pairs in two different bearings, the four pivots defining two orthogonal rotation axes. The two bearings are linked together by a floating intermediate part and the two rotation axes are actuated by motor-drive mechanisms situated inside the two bearings. However, this cardan joint requires the use of two pivots for each rotation axis and an assembly of three different parts that are difficult to interleave with one another. Furthermore, this cardan joint has a significant bulk and a high weight due notably to the use of four different pivots and to bulky annular structures linking these different elements together. This cardan joint is therefore not applicable to the fine pointing of small appendages.

SUMMARY OF THE INVENTION

The aim of the invention is to produce a flexible cardan joint that does not include the drawbacks of the existing devices and notably to produce a cardan joint which is compact, light, made up of a minimum number of elements and capable of withstanding the launch loads, typically 2000 N combined on 3 axes, with high angular capacity and long lifespan and that is applicable in particular to the fine pointing of small antennas, typically of the order of 50 cm to 1 m.

For this, the invention relates to a compact flexible cardan joint which comprises a hollow central longitudinal axis Z, two hollow pivots mounted orthogonally relative to one another and capable of pivoting respectively about a rotation axis X, Y, the three axes X, Y, Z being mutually orthogonal and intersecting at a point of rotation situated at the center of the cardan joint. Each pivot comprises an annular outer frame extending along a plane containing the central longitudinal axis Z and orthogonal to the rotation axis X, respectively Y, of the pivot, a hollow inner ring coaxial to the outer frame and a plurality of sets of flexible blades linked to the outer frame and to the inner ring, the two pivots being linked together by rigid link parts.

Preferentially, the two pivots of the cardan joint and the link parts are produced in a single-piece part.

According to a first embodiment of the cardan joint, the inner ring of each pivot is mounted floating, the outer frame of each pivot consists of a first intermediate frame part containing the axis Z and two outer frame parts situated parallel to and on either side of the intermediate frame part, and the two link parts have a hollow central longitudinal axis coinciding with the axis Z and are linked to the intermediate frame parts of each pivot.

The cardan joint according to the first embodiment can comprise two link mechanical parts in the form of a cross, the two first arms of each cross being diametrically opposed relative to one another and fastened to the intermediate frame part of the first pivot, and the two second arms of each cross being diametrically opposed relative to one another and fastened to the intermediate frame part of the second pivot.

Alternatively, the cardan joint may comprise two link mechanical parts in annular block form, each annular block being securely attached to the two respective intermediate frame parts of the first pivot and of the second pivot.

According to a second embodiment of the cardan joint, the outer frame of each pivot is mounted floating, the inner ring of each pivot consists of an intermediate ring part containing the axis Z and two outer ring parts situated parallel to and on either side of the intermediate ring part, and the two outer ring parts of the pivot are respectively securely attached to the two outer ring parts of the pivot and rigidly link the two pivots together.

Preferably, the four outer ring parts of the two pivots form a single-piece assembly common to the two pivots.

The invention also relates to a spacecraft comprising such a cardan joint.

BRIEF DESCRIPTION OF THE DRAWINGS

Other particular features and advantages of the invention will become clearly apparent hereinafter in the description given as a purely illustrative and nonlimiting example, with reference to the appended schematic drawings which represent:

FIGS. 3a to 3d: four schematic views illustrating the operation of the cardan joint of FIGS. 1c and 1d, according to the invention;

DETAILED DESCRIPTION

The exemplary cardan joint 5 represented in FIGS. 1a to 1d is hollow along a longitudinal and central axis Z. It comprises two hollow pivots 10, 11 with dual-stage flexible blades 12, 17, 18, 19 arranged orthogonal relative to one another. Each hollow pivot 10, 11 extends along a plane containing the longitudinal axis Z and orthogonal to the rotation axis X, respectively Y, of said pivot, the rotation axes X, Y of each pivot being at right angles to one another and at right angles to the longitudinal axis Z. The three axes X, Y, Z of the cardan joint intersect at a point of rotation situated at the center of the cardan joint. Preferably, the two pivots are provided in a single-piece part. Alternatively, the two pivots 10, 11 may consist of two separate parts linked together in a fixed manner.

Figure 1A:
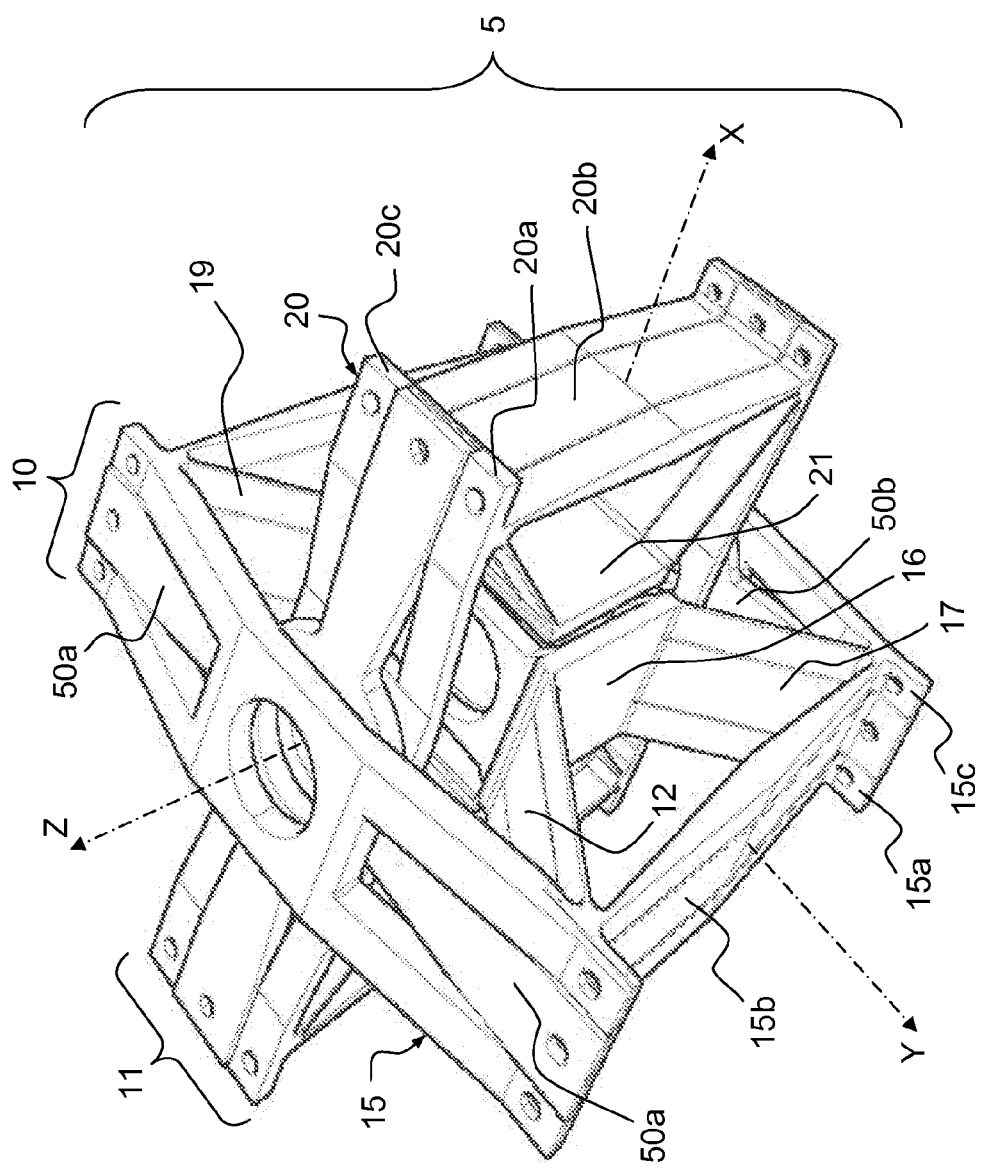
FIGS. 1a, 1b: two perspective views of a first exemplary compact flexible cardan joint, according to a first embodiment of the invention.
Figure 1B:
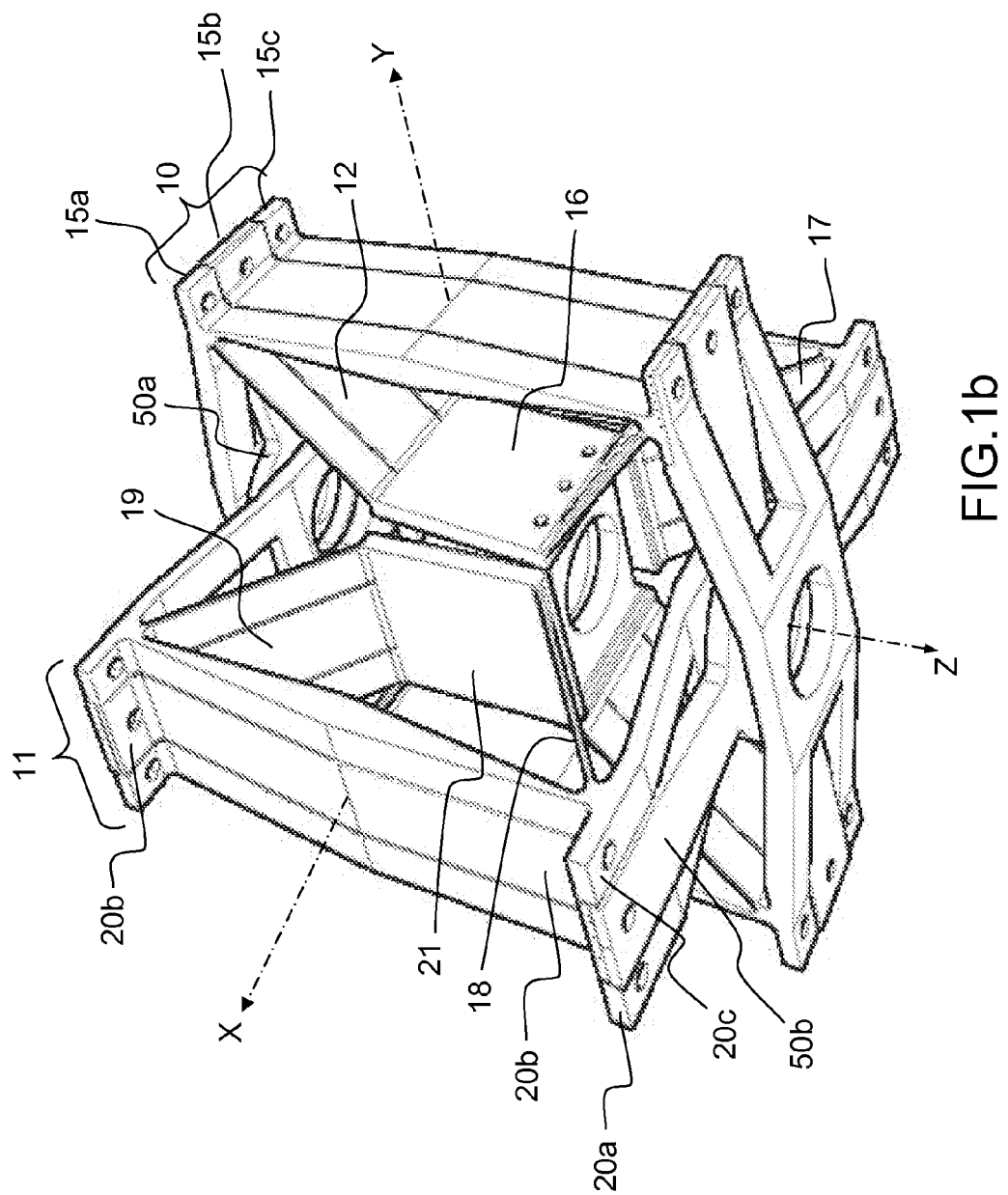
Figure 1D:
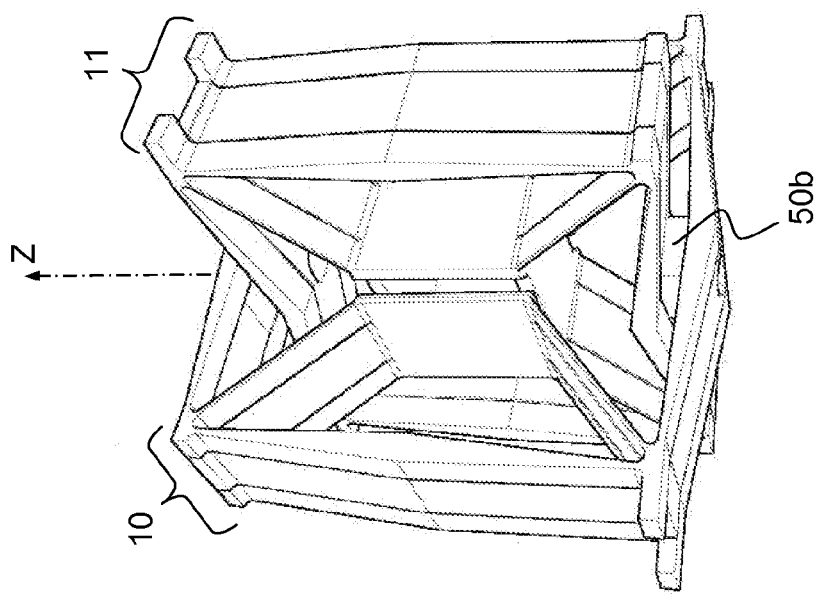
FIGS. 1c, 1d: two perspective views of a second exemplary compact flexible cardan joint, according to a variant embodiment of the invention.

In the exemplary embodiments represented in FIGS. 1a to 1d, the two pivots are linked together via two link mechanical parts, respectively top 50a and bottom 50b, each link mechanical part 50a, 50b being rigid and having a hollow central longitudinal axis coinciding with the axis Z. Each link mechanical part 50a, 50b can, for example, as represented in FIGS. 1a and 1b, be in the form of a cross comprising a hollow central longitudinal axis and four rigid radial arms arranged angularly about the central longitudinal axis or, as represented in FIG. 1d, be in the form of a block having a hollow central longitudinal axis, the block being able, for example, to be cylindrical or parallelepipedal. In a preferential embodiment, the two pivots 10, 11 and the two link mechanical parts 50a, 50b, of block form, are produced in a single-piece part.

Figure 1C:
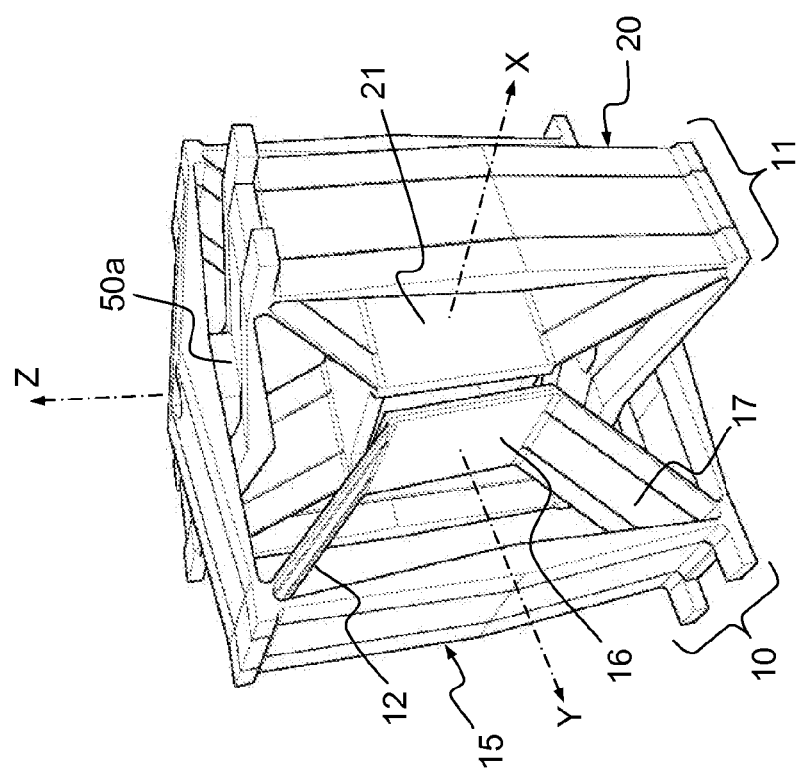
Figure 2:
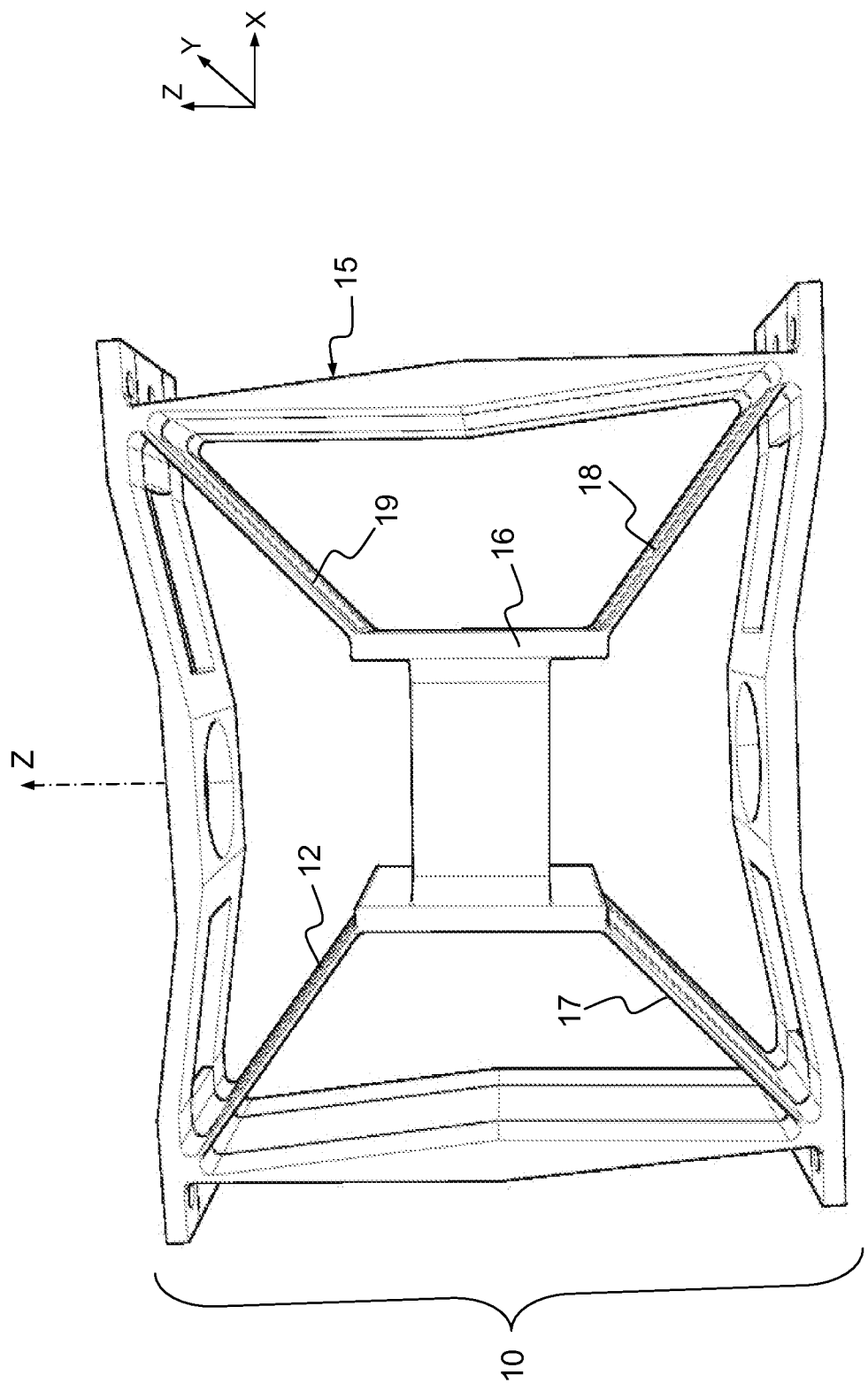
FIG. 2: a diagram of an exemplary structure of an exemplary pivot of a cardan joint in a plane XZ at right angles to the rotation axis Y of the pivot, according to the invention.
Figure 4A:
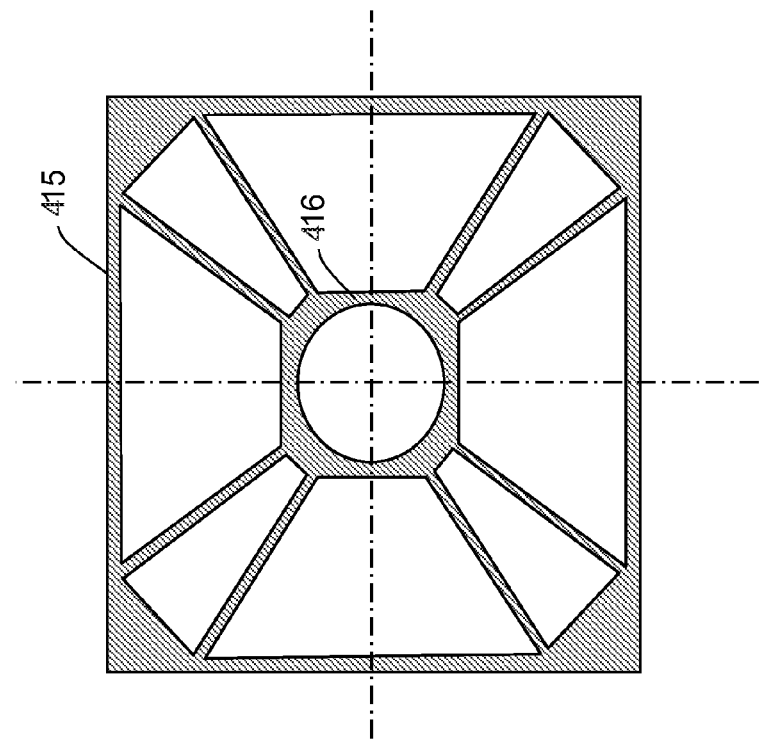
FIGS. 4a and 4b: two examples of layout of the sets of flexible blades of a pivot of the cardan joint, according to the invention.
Figure 4B:
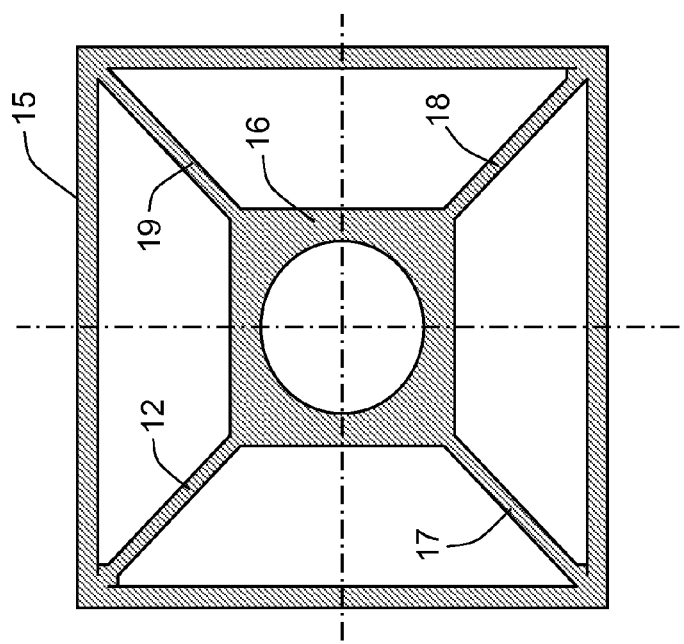

According to the first embodiment of the invention, as represented in FIG. 2, each pivot 10, 11 consists of an annular outer frame 15, 20 extending in a plane containing the longitudinal axis Z and orthogonal to the rotation axis of the pivot, a hollow inner floating ring 16, 21 coaxial to the outer frame 15, 20 and a plurality of sets of flexible blades 12, 17, 18, 19 linked to the outer frame 15, 20 and to the inner floating ring 16, 21. In the case of a dual-stage pivot, as represented in FIG. 2, the outer frame 15, 20 of each pivot 10, 11 comprises, in its thickness in a direction at right angles to the axis Z, three distinct parts 15a, 15b, 15c, 20a, 20b, 20c arranged in three mutually parallel planes orthogonal to the rotation axis of the pivot. The three distinct parts of the outer frame 15, 20 consist of a first intermediate frame part 15b, 20b containing the axis Z and two outer frame parts 15a, 15c, respectively 20a, 20c, situated symmetrically one either side of the intermediate frame part 15b, respectively 20b. Each part of the outer frame 15, 20 is linked to the inner floating ring 16, 21 by a plurality of sets of flexible blades 12, 17, 18, 19 distributed angularly. As a nonlimiting example, as represented in the diagrams of FIGS. 1a to 1d, 2 and in FIG. 4a, each pivot 10, 11 can comprise four sets 12, 17, 18, 19 of three flexible blades, a first end of which is linked to the outer frame 15, 20 and a second end of which is linked to the inner floating ring 16, 21. The two outer frame parts 15a, 15c, respectively 20a, 20c are linked to the inner floating ring 16, 21 via a first and a second flexible blades of each of the four sets of three flexible blades. The intermediate frame part 15b, 20b is linked to the floating ring 16, 21 by a third flexible blade of each of the four sets of three flexible blades. Alternatively, the number of sets of flexible blades may be different from four in particular, as represented in FIG. 4b, the number of sets of flexible blades between an outer frame part 415 and a floating ring 416 can be, for example, equal to eight.

The outer frame 15, 20 and the inner floating ring 16, 21 can, for example, have a section of cylindrical or polygonal form, such as, for example, rectangular as represented in the different figures. The flexible blades 12, 17, 18, 19 can be arranged in a radial direction of the pivot 10, 11 and converge on the longitudinal axes Z of the cardan joint. Alternatively, the flexible blades can be inclined in a direction forming a non-zero angle of inclination relative to the radial direction of the pivot.

In the examples represented in FIGS. 1a to 1d, the two pivots 10, 11 of the cardan joint are arranged orthogonally relative to one another, the rotation axes X and Y of the two pivots 10, 11 being at right angles to one another. For this, the dimensions of the different parts forming the two pivots are arranged so that the two pivots of the cardan joint are interleaved one inside the other in a central region of revolution about the axis Z, the two rotation axes X and Y of the two pivots converging at the center of the cardan joint situated on the axis Z. Thus, the inner floating ring 21 of the pivot 11 has peripheral dimensions greater than that of the pivot 10 so that the inner floating ring 21 of the pivot 11 is mounted around the floating ring 16 of the pivot 10 without there being any contact between the two floating rings 16, 21. Moreover, the outer frame 20 of the pivot 11 comprises a bottom part and a top part that are concave whereas the outer frame 15 of the pivot 10 comprises a bottom part and a top part that are convex so that the outer frame 15 of the pivot 10 is mounted around the outer frame 20 of the pivot 11. Furthermore, the two pivots 10, 11 are linked orthogonally to one another via the two rigid mechanical parts 50a, 50b, respectively top and bottom, mounted between the top convex and concave parts of the two pivots 10, 11 and respectively between the bottom convex and concave parts of the two pivots 10, 11. In FIGS. 1a and 1b, the two link mechanical parts 50a, 50b comprise four arms arranged in the form of a cross. The two arms of each cross, diametrically opposed to one another, are fastened onto the intermediate frame part 15b of the first pivot 10, the two other arms of each cross, diametrically opposed to one another, are fastened to the intermediate frame part 20b of the second pivot 11. In FIGS. 1c and 1d, the two link mechanical parts 50a, 50b are in the form of an annular block, each annular block being securely attached to the two respective intermediate frame parts 15b, 20b of the first pivot 10, and of the second pivot 11. The cardan joint can then turn in rotation about the point of intersection of the three axes X, Y, Z.

Figure 6:
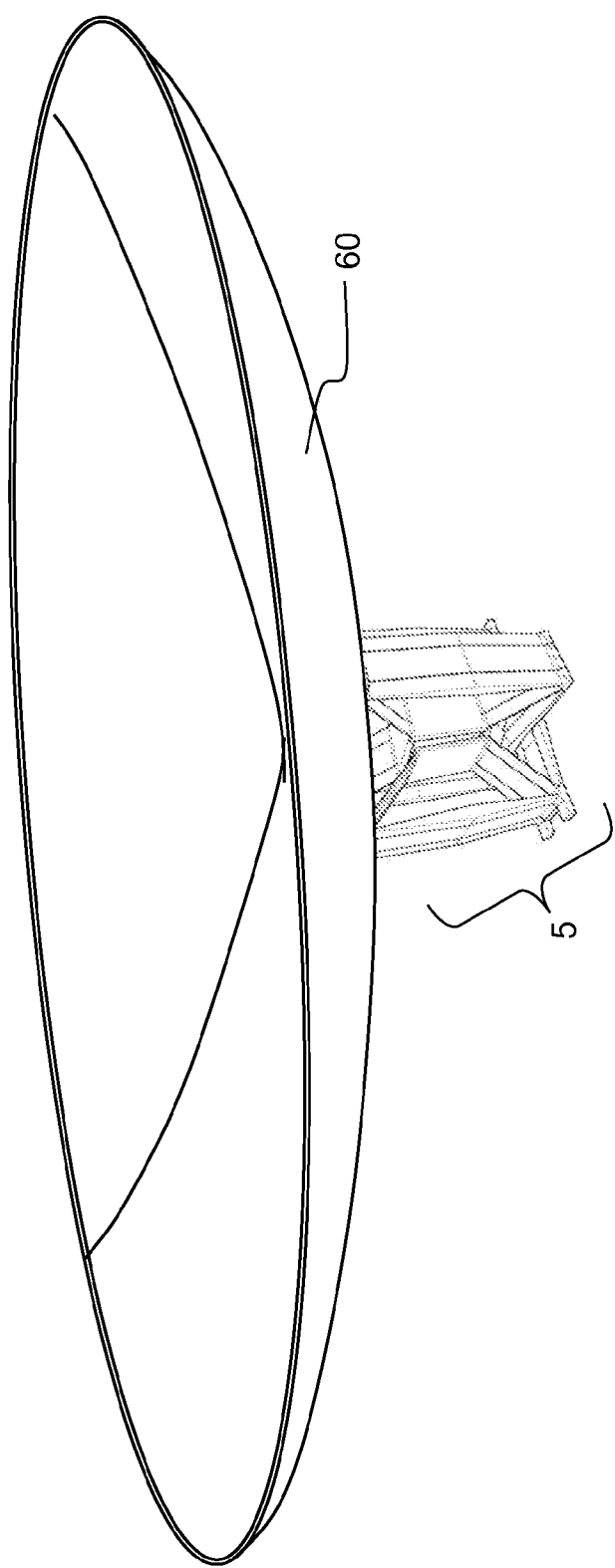
FIG. 6: an exemplary application of the cardan joint to the orientation of a reflector of an antenna, according to the invention.

The operation of the cardan joint according to the exemplary embodiment of FIGS. 1c and 1d is schematically represented in FIGS. 3a to 3d. The second pivot 11 has a rotation axis oriented in the direction Y and the first pivot 10 has a rotation axis oriented in the direction X. In the example represented, it is assumed that the outer frame parts 20a, 20c of the second pivot 11 are fastened, in their top part, to an element to be oriented, for example a reflector 60 of an antenna as represented in FIG. 6, and that the outer frame parts 15a, 15c of the first pivot 10 are fastened, in their bottom part, onto a support structure, for example a satellite.

Figure 3A:
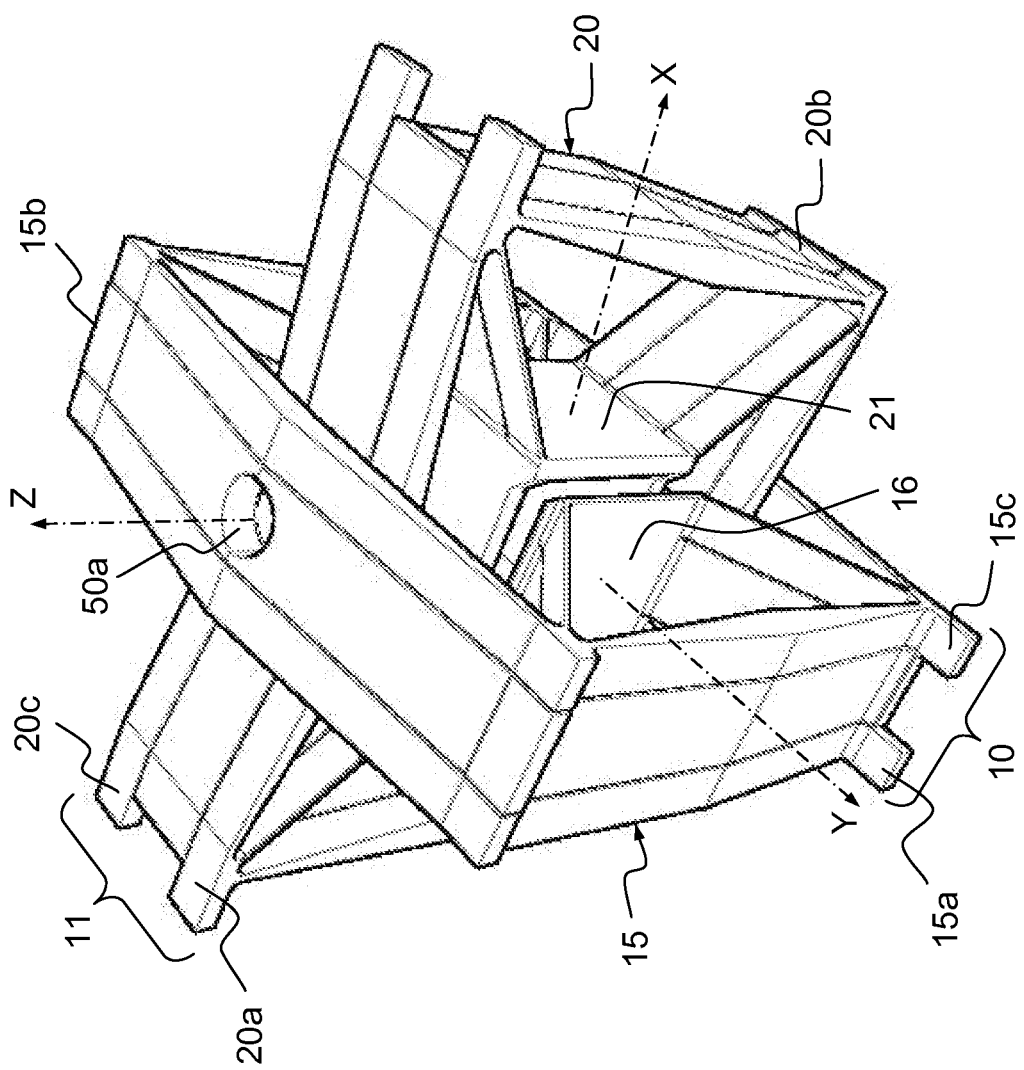

In FIG. 3a, the cardan joint is in a rest position, the three parts of the frame 15, 20 of each pivot 10, 11 are superposed along the rotation axis of the corresponding pivot and the flexible blades are at rest.

In FIG. 3b, the intermediate frame part 15b of the pivot 10 is actuated in rotation by an angle chosen, for example, to be between −8° and +8°, about the axis X, for example by means of an actuator or a motor 30. The rotational movement of the intermediate frame part 15b is transmitted, via the flexible blades, to the inner floating ring 16 of the pivot 10 which is not linked to any other element and is free to follow the rotational motion of the intermediate frame part 15b. The rotational motion of the inner floating ring 16 is then transmitted in the flexible blades linked to the two outer frame parts 15a, 15c of the pivot 10. Since these outer frame parts 15a, 15c are fastened onto a support, they do not move and the flexible blades which are linked to them bend. Moreover, the two intermediate frame parts 15b, 20b of the two pivots 10, 11, being linked together, via the two link mechanical parts 50a, 50b, the rotation of the intermediate frame part 15b of the first pivot 10 about the axis X causes the whole of the second pivot 11 to tilt, by one and the same angle a, about the axis X.

Figure 3C:
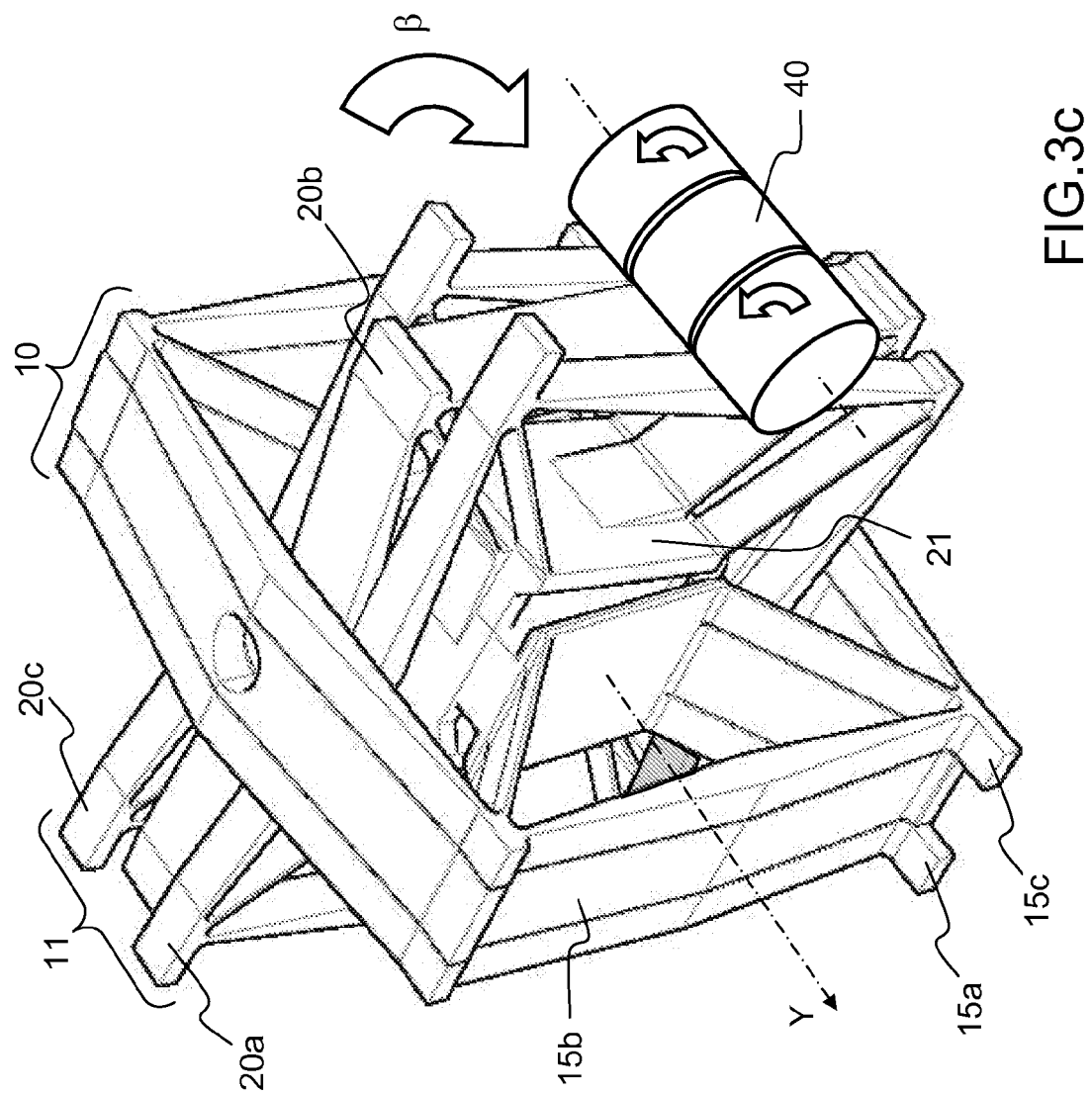

In FIG. 3c, the two outer frame parts 20a, 20c of the second pivot 11 are actuated in rotation by an angle β chosen, for example, to be between −8° and +8°, about the axis Y, for example by means of an actuator or a motor 40. The rotational motion of the two outer frame parts 20a, 20c is transmitted, via the flexible blades, to the inner floating ring 21 of the second pivot 11 which is not linked to any other element and is free to follow the rotational motion of the two outer frame parts 20a, 20c. The rotational motion of the floating ring 21 is then transmitted in the flexible blades linked to the intermediate frame part 20b of the second pivot 11. Since this intermediate frame part 20b is fastened to the intermediate frame part 15b of the first pivot 10 by the two link mechanical parts 50a, 50b, and since the first pivot 10 does not move, the intermediate frame part 20b does not move and the flexible blades which are linked to it bend. Only the two outer frame parts 20a, 20c of the second pivot 11 therefore undergo the rotational motion by the angle A which makes it possible to orient the element fastened to these outer parts 20a, 20c relative to the axis Y.

Figure 3D:
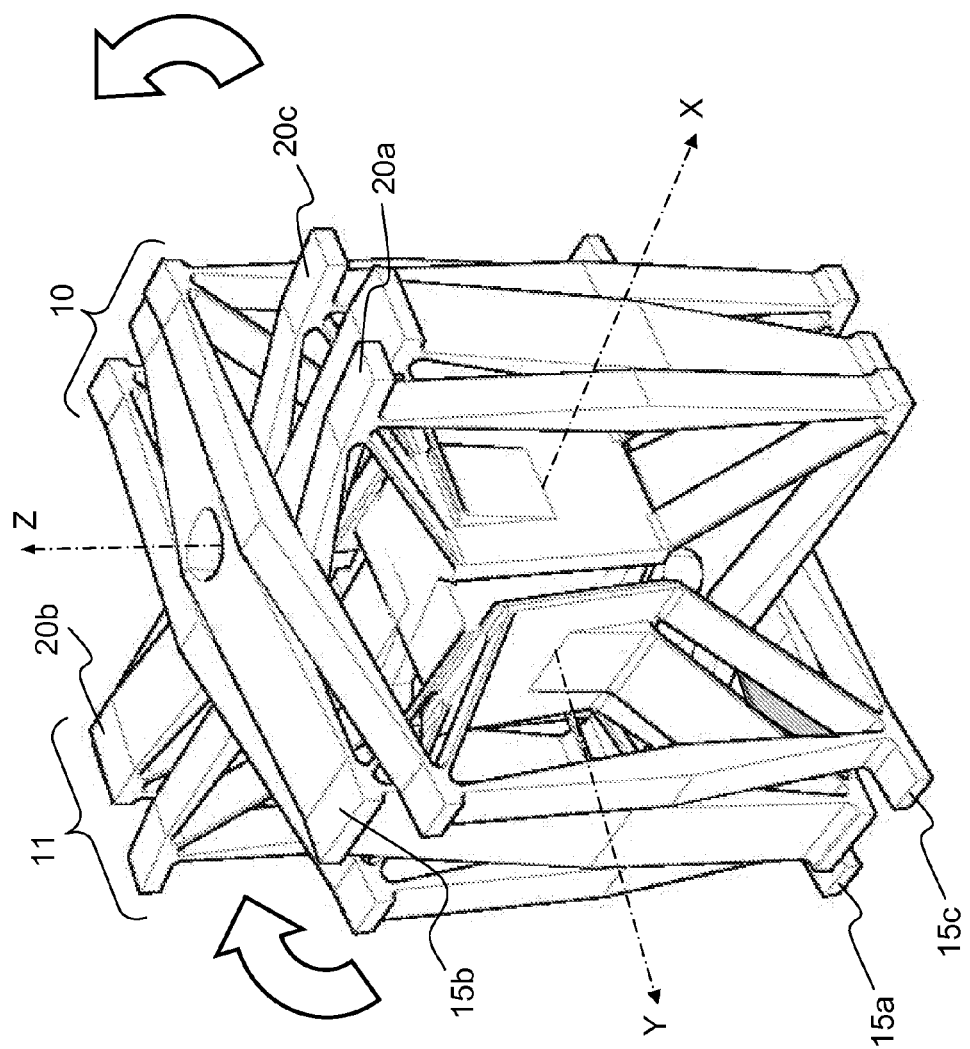

In FIG. 3d, the two pivots 10, 11 are actuated in rotation, simultaneously or in succession, by respectively actuators 30, 40, about their respective axis X or Y, which makes it possible to orient the element fastened onto the outer frame parts 20a, 20c of the pivot 11 relative to the two axes X and Y. The combined rotational motions of the two pivots 10, 11 of the cardan joint are produced as described above for FIGS. 3b and 3c. The element mounted on the cardan joint can then be oriented in any chosen position according to the angular capability of the two pivots of the cardan joint. For example, if the angles α and β are between −8° and +8° as described above, the cardan joint makes it possible to cover a region situated in a cone of revolution that has an angular aperture of between −8° and +8°.

All the parts forming the cardan joint are hollow along the longitudinal axis Z of the cardan joint. The cardan joint is therefore hollow along the axis Z which makes it possible to be able to fit cables or waveguides inside the cardan joint, along the axis Z.

Figure 5:
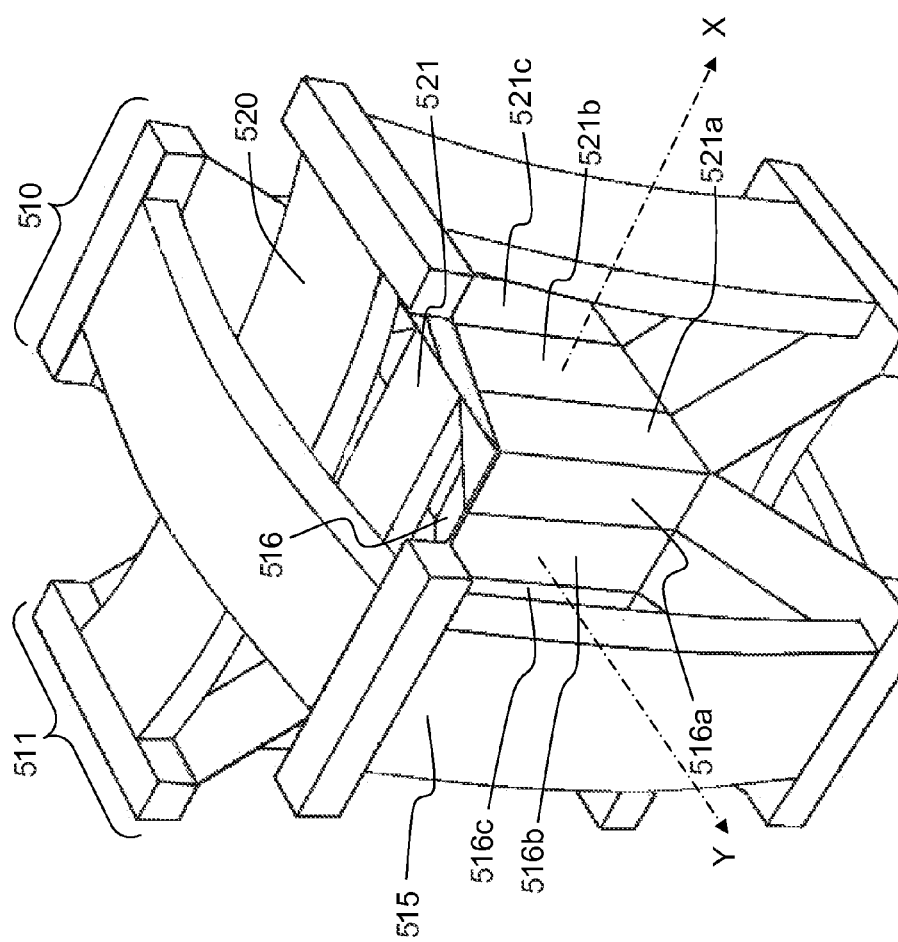
FIG. 5: a perspective view of a second exemplary compact flexible cardan joint according to a second embodiment of the invention.

FIG. 5 represents a second embodiment of the cardan joint in which the functions of the outer frame and of the inner ring of each pivot are reversed. According to this second embodiment, each pivot 510, 511 of the cardan joint comprises an outer frame 515, 520 mounted floating and an inner ring 516, 521 consisting of an intermediate ring part 516b, 521b containing the axis Z and two outer rings parts 516a, 516c situated parallel to and symmetrically on either side of the intermediate ring part 516b. Each part of the inner ring 516, 521 is linked to the outer floating frame 515, 520 via a plurality of sets of three flexible blades. The two outer ring parts 516a, 516c of the pivot 510 are respectively securely attached to the two outer ring parts 521a, 521c of the pivot 511 and constitute common rigid links linking the two pivots 510, 511 together. Preferably, the four outer ring parts 516a, 516c, 521a, 521c of the two pivots 510, 511 form a one-piece assembly common to the two pivots 510, 511.

In FIG. 5, the pivot 511, interleaved in the pivot 510, has a rotation axis oriented in the direction Y and the pivot 510, amounted around the pivot 511, has a rotation axis oriented in the direction X.

In this example, it is assumed that the intermediate ring part 521b of the pivot 511 is fastened, in the top part of the cardan joint, to an element to be oriented, for example a reflector 60 of an antenna as represented in FIG. 6, and that the intermediate ring part 515b of the pivot 510 is fastened, in the bottom part of the cardan joint, onto a support structure, for example a satellite.

To produce a rotation of the element to be oriented about the axis Y, the intermediate part 521b of the inner ring 521 of the pivot 511 is actuated in rotation by a chosen angle relative to the securely attached outer parts 516a, 516c, 521a, 521c of the two inner rings of the two pivots 510, 511. The rotational motion of the intermediate ring part 521b of the pivot 511 is transmitted, via the flexible blades, to the outer floating frame 520 of the pivot 511 which is not linked to any other element and is free to follow the rotational motion transmitted by the intermediate ring part 521b. The rotational motion of the floating frame 520 is then transmitted in the flexible blades linked to the securely attached outer ring parts 516a, 516c, 521a, 521c of the pivot 511 and of the pivot 510.

To produce a rotation of the element to be oriented about the axis X, the securely attached outer ring parts 516a, 516c, 521a, 521c of the pivot 511 and of the pivot 510 are actuated in rotation by a chosen angle relative to the intermediate ring part 516b of the pivot 510 which remains fixed. The rotational motion of the securely attached outer ring parts 516a, 516c, 521a, 521c is transmitted, via the flexible blades, to the outer floating frame 515 of the pivot 510 which is not linked to any other element and is free to follow the rotational motion of the securely attached outer ring parts 516a, 516c, 521a, 521c. The rotational motion of the outer floating frame 515 is then transmitted to the rest of the cardan joint.

Although the invention has been described with respect to particular embodiments, it is obvious that it is in no way limited thereto and that it encompasses all the technical equivalents of the means described as well as their combinations provided that the latter fall within the framework of the invention.

The invention claimed is:

1. A cardan joint that is compact and flexible, the cardan joint comprising:
    a first pivot configured to pivot about a first rotation axis;
    a second pivot configured to pivot about a second rotation axis; and
    link parts that are rigid and link the first pivot and the second pivot together in a fixed manner,
    wherein each of the first pivot and the second pivot includes:
        an annular outer frame,
        a hollow inner ring coaxial to the annular outer frame, and
        a plurality of sets of blades, each blade including a first end linked to the annular outer frame and a second end linked to the hollow inner ring,
    wherein the cardan joint defines a central longitudinal axis and is hollow along the central longitudinal axis,
    wherein the first rotation axis, the second rotation axis, and the central longitudinal axis are mutually orthogonal and intersect at a point of rotation situated at a center of the cardan joint,
    wherein the annular outer frame of the first pivot extends orthogonal to the first rotation axis along a first plane containing the central longitudinal axis, and
    wherein the annular outer frame of the second pivot extends orthogonal to the second rotation axis along a second plane containing the central longitudinal axis.

2. The cardan joint as claimed in claim 1, wherein the first pivot, the second pivot, and the link parts are produced in a single-piece part.

3. The cardan joint as claimed in claim 1,
    wherein each hollow inner ring is mounted floating,
    wherein each annular outer frame includes:
        an intermediate frame part containing the central longitudinal axis,
        a first outer frame part positioned on a first side of the intermediate frame part, and
        a second outer frame part positioned on a second side of the intermediate frame part parallel to the intermediate frame part and the first outer frame part, and
    wherein the link parts define a longitudinal axis coinciding with the central longitudinal axis and are linked to an intermediate frame part of the first pivot and an intermediate frame part of the second pivot.

4. The cardan joint as claimed in claim 3, further comprising two link mechanical parts, each link mechanical part comprising four arms spaced apart angularly and arranged in the form of a cross, in that two first arms of each cross are diametrically opposed relative to one another and fastened to the intermediate frame part of the first pivot, and two second arms of each cross are diametrically opposed relative to one another and fastened to the intermediate frame part of the second pivot.

5. The cardan joint as claimed in claim 3, further comprising two link mechanical parts and each link mechanical part has a block form and is securely attached to the intermediate frame part of the first pivot and the intermediate frame part of the second pivot.

6. The cardan joint as claimed in claim 1,
    wherein each annular outer frame is mounted floating,
    wherein each hollow inner ring includes:
        an intermediate ring part containing the central longitudinal axis
        a first outer ring part positioned on a first side of the intermediate ring part, and
        a second outer ring part positioned on a second side of the intermediate ring part parallel to the intermediate ring part and the first outer ring part, and
    wherein a first outer ring and a second outer ring part of the first pivot are securely attached to a first outer ring part and a second outer ring part of the second pivot and rigidly link the first pivot and the second pivot together.

7. The cardan joint as claimed in claim 6, wherein the first outer ring part and the second outer ring part of the first pivot and the first outer ring part and the second outer ring part of the second pivot form a single-piece assembly common to the first pivot and the second pivot.

8. A spacecraft comprising at least one cardan joint as claimed in claim 1.

* * * * *